(12) United States Patent
Chin et al.

(10) Patent No.: US 10,796,630 B2
(45) Date of Patent: Oct. 6, 2020

(54) LIGHT EMITTING DIODE DISPLAY SYSTEM AND IMAGE DETECTING METHOD

(71) Applicant: SILICON TOUCH TECHNOLOGY INC., Hsinchu (TW)

(72) Inventors: Chi-Yuan Chin, Hsinchu (TW); Kuei-Jyun Chen, Hsinchu (TW); Tao-Lun Darren Chin, Hsinchu (TW)

(73) Assignee: SILICON TOUCH TECHNOLOGY INC., Hsinchu (TW)

( * ) Notice: Subject to any disclaimer, the term of this patent is extended or adjusted under 35 U.S.C. 154(b) by 0 days.

(21) Appl. No.: 16/289,909

(22) Filed: Mar. 1, 2019

(65) Prior Publication Data

US 2019/0318683 A1 Oct. 17, 2019

(30) Foreign Application Priority Data

Apr. 11, 2018 (TW) .............................. 107112404 A

(51) Int. Cl.
*G09G 5/00* (2006.01)
*G09G 3/32* (2016.01)

(52) U.S. Cl.
CPC ..................................... *G09G 3/32* (2013.01)

(58) Field of Classification Search
CPC .......... G09G 3/32; G09G 3/006; G06F 3/1431
See application file for complete search history.

(56) References Cited

U.S. PATENT DOCUMENTS

| 2011/0187740 A1* | 8/2011 | Jung ........................ G09G 5/00 |
| | | 345/619 |
| 2016/0275835 A1 | 9/2016 | Yuan et al. |
| 2019/0172383 A1 | 6/2019 | Matsui et al. |

FOREIGN PATENT DOCUMENTS

| CN | 101430456 A | 5/2009 |
| CN | 106328088 A | 1/2017 |
| JP | 62155540 U | 10/1987 |
| JP | 8179744 A | 7/1996 |
| JP | 2002196742 A | 7/2002 |
| TW | 552575 | 9/2003 |
| TW | 201307979 A1 | 2/2013 |
| TW | 201445539 A | 12/2014 |
| TW | I522823 B | 2/2016 |
| WO | WO 2018037525 A1 | 3/2018 |

* cited by examiner

*Primary Examiner* — Adam R. Giesy
(74) *Attorney, Agent, or Firm* — Li & Cai Intellectual Property (USA) Office

(57) ABSTRACT

A light emitting diode display system includes a first LED display module, a second LED display module, a control module, and a first driving module. The first LED display module includes a plurality of LED units for displaying an image. The first driving module is electrically connected to the control module and the first LED display module. The control module provides a plurality of control signals corresponding to the image to the first driving module for driving the LED units of the first LED display module, and displaying the image on the second LED display module. The image of the first light emitting diode display module is determined by a user according to the image displayed on the second light emitting diode display module.

8 Claims, 4 Drawing Sheets

LIGHT EMITTING DIODE DISPLAY SYSTEM AND IMAGE DETECTING METHOD

CROSS-REFERENCE TO RELATED PATENT APPLICATION

This application claims the benefit of priority to Taiwan Patent Application No. 107112404, filed on Apr. 11, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light emitting diode display system; in particular, and more particularly to a light emitting diode display system having at least two light emitting diode display module

BACKGROUND OF THE DISCLOSURE

In recent years, the demand for large-size light emitting diode (LED) display modules has greatly increased, especially in outdoor billboards, which it is an advantage of large-size LED display modules. The large-size LED display module can not only be adjusted according to the actual size of the area. Comparing to the same size LCD panel, the LED display module is more cost-effective. However, a driving circuit or other circuit of a LED display module mounted in an outdoor place are easily damaged due to weather, which causes distortion in displaying image information. In general, a monitoring device is additionally provided for monitoring the image of the LED display module. However, this not only increases the cost, but also is not easy to apply in some dangerous places (for example: exterior walls of the high-rise building).

Therefore, it is an important issue in the industry to provide a LED display system capable of quickly detecting whether the image of the LED display module mounted at remote site is distorted.

SUMMARY OF THE DISCLOSURE

In response to the above-referenced technical inadequacies, the present disclosure provides a light emitting diode system. The light emitting diode display system includes a first light emitting diode display module, including a plurality of light emitting diode units for displaying an image; a second light emitting diode display module; a control module; and a first driving module, electrically connected to the control module and the first light emitting diode display module. The control provides a plurality of control signals corresponding to the image to the first driving module for driving the light emitting diode units of the first light emitting diode display module, and displaying the image on the second light emitting diode unit display module. A user determines the image of the first light emitting diode display module according to the image displayed on the second light emitting diode display module.

In one aspect, the present disclosure provides an image detecting method. The image detecting method is used for a light emitting diode display system. The image detecting method includes the following step: driving a first light emitting diode display module to display at least one first image according to a plurality of control signals; returning the control signals; driving a second light emitting diode display system to display the at least one first image according to the transmitted control signals; determining whether the first image of the first light emitting diode display module is distorted according to the first image of the second light emitting diode display module.

According to the above, it is not necessary to utilize any additional detecting devices that are mounted at the area of the first LED display module. In other words, the second LED display module at the control site is used to determine whether the image displayed on the remote first LED display module has any pixel errors. Therefore, a lot of detecting devices and cost can be reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
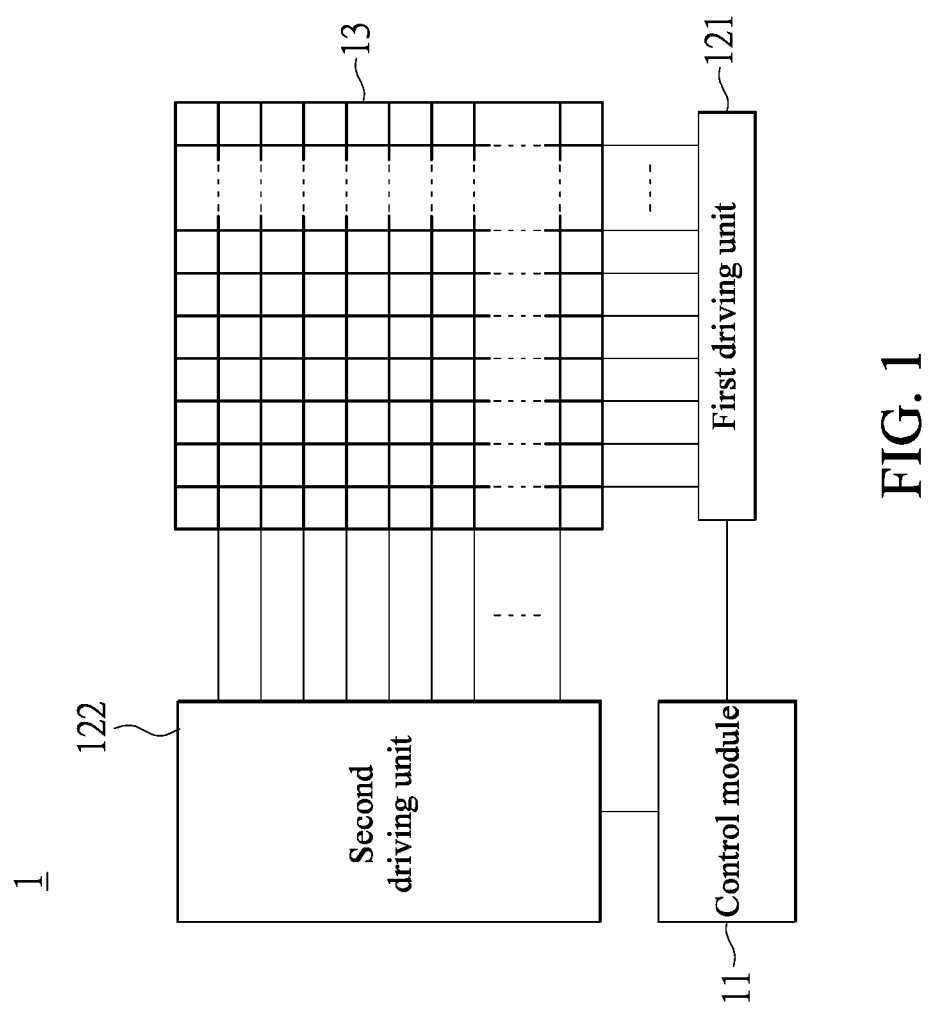
FIG. 1 is a schematic diagram of the first light emitting diode display module driven by the control module according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
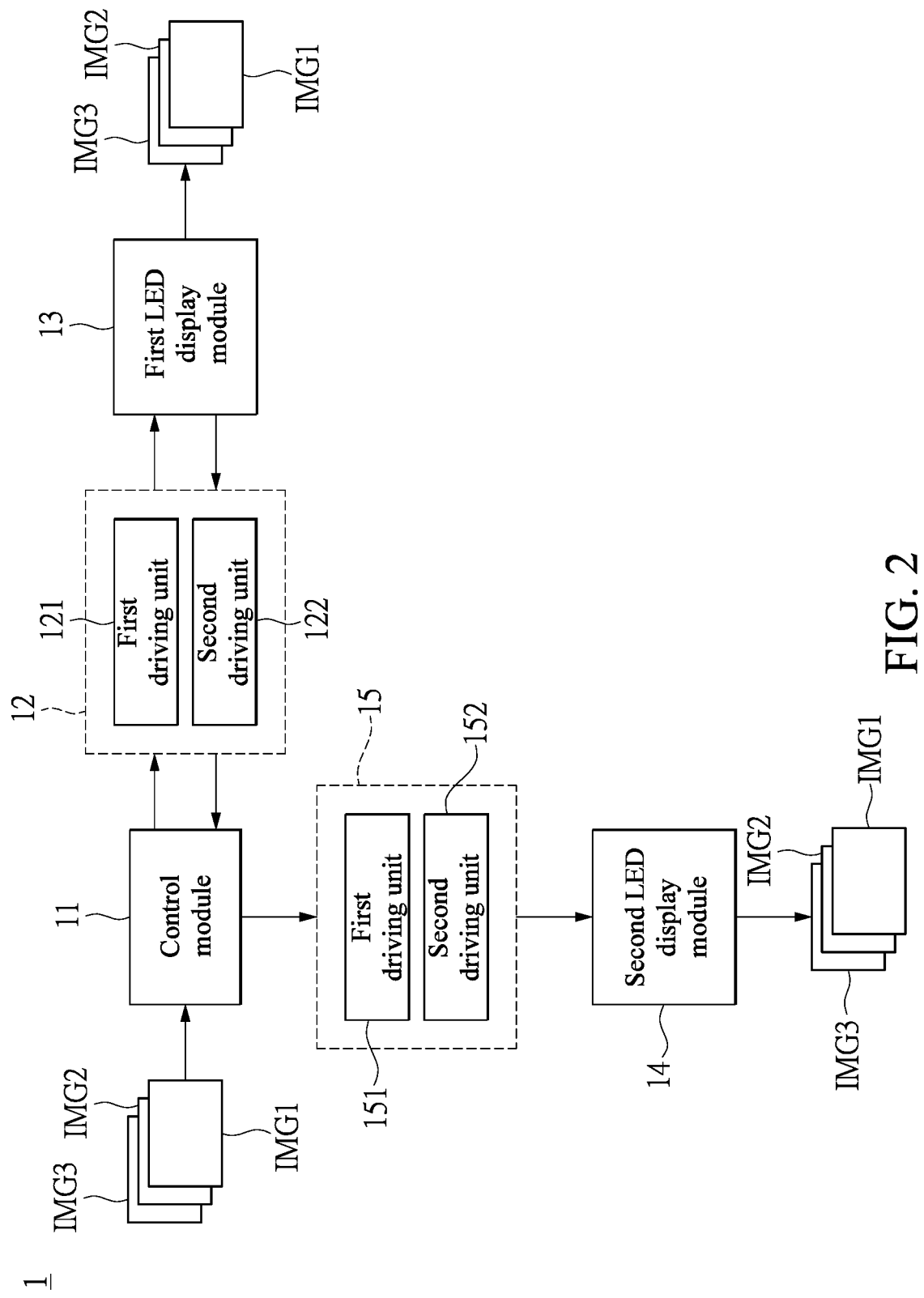
FIG. 2 is a schematic diagram of the light emitting diode display system according to an embodiment of the present disclosure.

Referring to FIG. 1 and FIG. 2, FIG. 1 is a schematic diagram of the first light emitting diode display module driven by the control module according to an embodiment of the present disclosure. FIG. 2 is a schematic diagram of the light emitting diode display system according to an embodiment of the present disclosure.

The light emitting diode (LED) display system 1 includes a control module 11, a first driving module 12, a first light emitting diode (LED) display module 13, and a second light emitting diode (LED) display module 14. In the embodiment, the first driving module 12 includes a first driving unit 121 and a second driving unit 122. In general method for controlling the first LED display module, the control module 11 provides control signals to the first driving unit 121 and the second driving unit 122 of the first driving module 12 for providing driving signals to the light emitting diode (LED) units (not shown) of the first LED display module 13. The control module receives a plurality of images and transforms the images into a plurality of control signals corresponding to each image. In the embodiment, the control image 11 receives the first image IMG1, the second image IMG2, and the third image IMG3, and transmits the control signals corresponding to the first image IMG1, the second IMG2, and the third IMG3 to the first driving unit 121 and the second driving unit 122 of the first driving module 12 for driving the first LED display module 13 to display the first image IMG1, the second IMG2, and the third IMG3. In the embodiment, the first LED display module 13 is mounted at a first area, and the first area is an outdoor area. The second LED display module 14 is mounted at a second area, and the second area is an indoor area. In the embodiment, the second LED display module 14 is mounted at the providing terminal of the images, which is a monitoring room.

However, the driving signals of the first driving unit 121 and the second driving unit 122 for driving the first LED display module 13 are transmitted to the control module 11 for checking the driving signals of the for checking whether the first image IMG1, the second IMG2, and the third IMG3 are correctly displayed on the first LED display module 13. Then, the control module 11 transmits the returned driving signals of the first driving unit 121 and the second driving unit 122 of the first driving module 12 to the second driving module 15.

In the embodiment, the second driving module 15 includes a first driving unit 151 and a second driving unit 152. The first driving unit 151 and the second driving unit 152 respectively provide a plurality of driving signals to display second LED display module 14 for displaying the image on the second LED display module 14.

For example, when the control module 11 transmits the control signals corresponding to the first image IMG1 to the first driving unit 121 and the second driving unit 122 of the first driving module 12, the first driving unit 121 and the second driving unit 122 transform the control signals corresponding to the first image IMG1 into the driving signals corresponding to the first image IMG1 to drive the LED units (not shown) of the first LED display module 13 for displaying the first image on the first LED display module 13.

Then, the first driving unit 121 and the second driving unit 122 of the first driving module 12 sequentially and transmit the driving signals corresponding to the first image IMG1 to the first driving module 12 and the control module 11. The control module 11 transmits the driving signals corresponding to the first image IMG1 to the second driving module 15 for driving the LED units (not shown) of the second LED display module 14 to display the first image IMG1.

In the embodiment, the driving signals corresponding to the first image IMG1 of the first LED display module 13 of the LED display system 1 are returned, and the second LED display module 14 is used for reproducing the first image IMG1 displayed on the first LED display module 13. A user determines whether the first image IMG1 on the first LED display module 13 has any distortion according to the first image displayed on the second LED display module 14.

In the embodiment, a size of the first LED display module 13 and a size of the second LED display module 14 are the same or similar. In other words, the first image IMG1, the second IMG2, and the third image IMG3 on the first LED display module 13 can be re-displayed on the second LED display module 14. When the first image IMG1, the second IMG2, and the third image IMG3 on the first LED display module 13 have pixel errors caused by the image distortions or a loss of control signals, those pixel errors are also occurred on the first image IMG1, the second IMG2, and the third image IMG3 on the second LED display module 14. Therefore, the monitor can quickly fix and correct the issues. In the other embodiment, the size of the first LED display module 13 and the size of the second LED display module 14 can be different. The number of the LED units of the first LED display module 13 can be different from the number of the LED units of the second LED display module 14.

Second Embodiment

Figure 3:
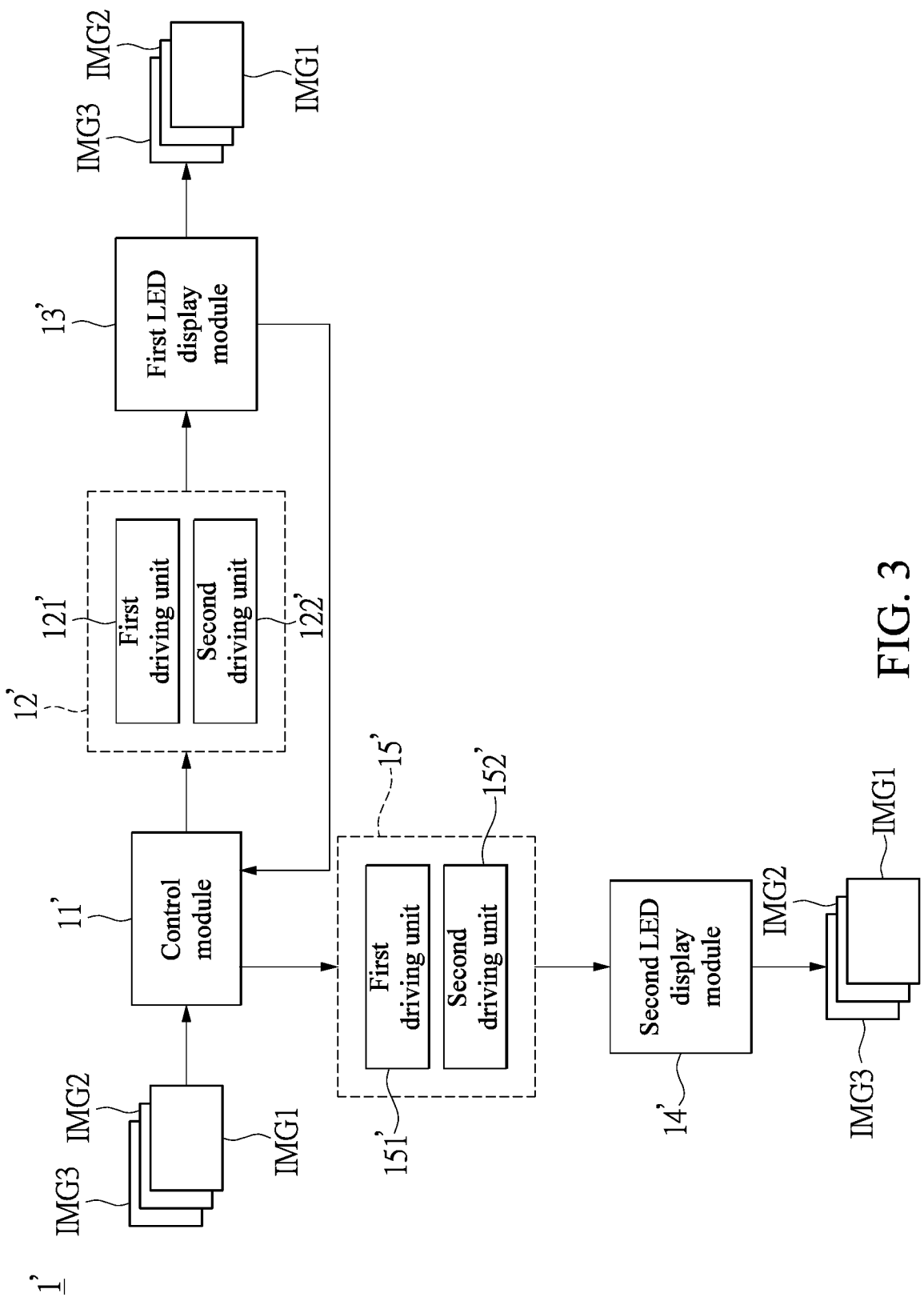
FIG. 3 is another schematic diagram of the light emitting diode display system according to an embodiment of the present disclosure.
Figure 4:
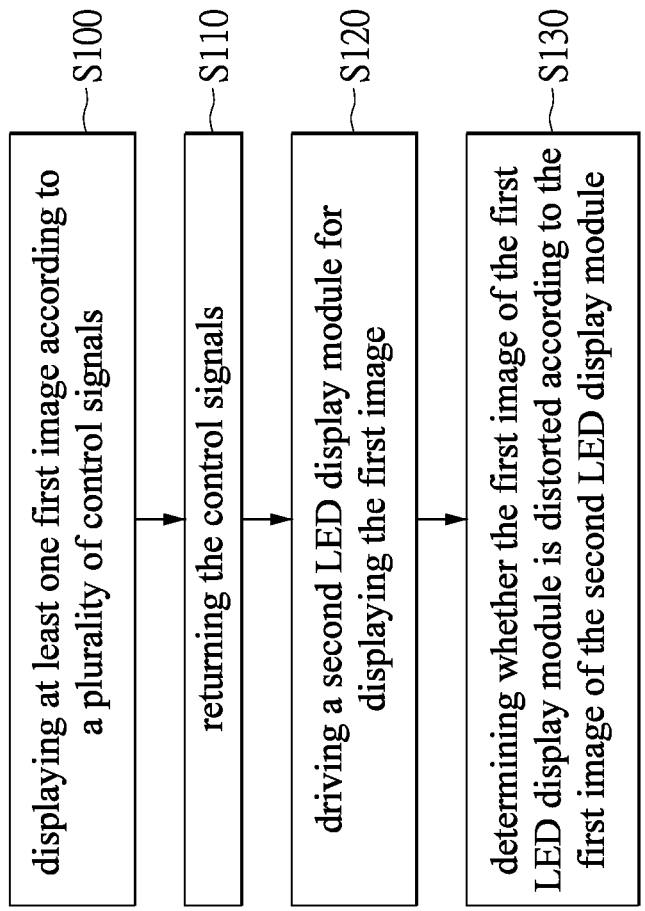
FIG. 4 is a flow chart of the image detecting method according to an embodiment of the present disclosure.

Referring to FIG. 3, FIG. 3 is another schematic diagram of the LED display system according to an embodiment of the present disclosure.

The LED display system 1' includes a control module 11', a first driving module 12', a first LED display module 13, and a second LED display module 14'. In the embodiment, the first driving module 12' includes a first driving unit 121' and a second driving unit 122'. In general method for controlling the first LED display module, the control module 11' provides control signals to the first driving unit 121' and the second driving unit 122' of the first driving module 12' for providing driving signals to the LED units (not shown) of the first LED display module 13'. The control module receives a plurality of images and transforms the images into a plurality of control signals corresponding to each image. In the embodiment, the control image 11' receives the first image IMG1, the second image IMG2, and the third image IMG3, and transmits the control signals corresponding to the first image IMG1, the second IMG2, and the third IMG3 to the first driving unit 121' and the second driving unit 122' of the first driving module 12' for driving the first LED display module 13 to display the first image IMG1, the second IMG2, and the third IMG3.

However, the driving signals of the first driving unit 121 and the second driving unit 122 for driving the first LED display module 13 are transmitted to the control module 11 for checking the driving signals of the for checking whether the first image IMG1, the second IMG2, and the third IMG3 are correctly displayed on the first LED display module 13. Then, the control module 11 transmits the returned driving signals of the first driving unit 121 and the second driving unit 122 of the first driving module 12 to the second driving module 15.

In the embodiment, the second driving module 15 includes a first driving unit 151 and a second driving unit 152. The first driving unit 151 and the second driving unit 152 respectively provide a plurality of driving signals to display second LED display module 14 for displaying the image on the second LED display module 14.

In other words, when the control module 11' transmits the control signals corresponding to the first image IMG1 to the first driving unit 121' and the second driving unit 122' of the first driving module 12' to drive the LED units (not shown) of the first LED display module 13' for displaying the first image IMG1.

Then, the first driving unit 121' and the second driving unit 122' of the first driving module 12' sequentially and transmit the driving signals corresponding to the first image IMG1 to the first driving module 12' and the control module 11'. The control module 11' transmits the driving signals corresponding to the first image IMG1 to the second driving module 15' for driving the LED units (not shown) of the second LED display module 14' to display the first image IMG1.

In the embodiment, the driving signals corresponding to the first image IMG1 of the first LED display module 13' of the LED display system 1' are returned, and the second LED display module 14' is used for reproducing the first image IMG1 displayed on the first LED display module 13'. A user determines whether the first image IMG1 on the first LED display module 13' has any distortion according to the first image displayed on the second LED display module 14'.

In the embodiment, a size of the first LED display module 13' and a size of the second LED display module 14' are the same or similar. In other words, the first image IMG1, the second IMG2, and the third image IMG3 on the first LED display module 13' can be re-displayed on the second LED display module 14'. When the first image IMG1, the second IMG2, and the third image IMG3 on the first LED display module 13' have pixel errors caused by the image distortions or a loss of control signals, those pixel errors are also occurred on the first image IMG1, the second IMG2, and the third image IMG3 on the second LED display module 14'. Therefore, the monitor can quickly fix and correct the issues. In the other embodiment, the size of the first LED display module 13' and the size of the second LED display module 14' can be different. The number of the LED units of the first LED display module 13' can be different from the number of the LED units of the second LED display module 14'.

The present disclosure further provides an image detecting method, adapted for LED display system described in the above embodiment. The image detecting method of the present disclosure is adapted for the display system with at least two LED display modules.

In the embodiment, the detecting method includes the following steps: displaying at least one first image according to a plurality of control signals (Step S100); returning the control signals (Step S110); driving a second LED display module for displaying the first image (Step S120); and determining whether the first image of the first LED display module is distorted according to the first image of the second LED display module (Step S130).

In Step S100, the control module 11 of the LED display system 1 is used for providing control signals to the first driving module 12 for driving the first LED display module 13 to display the at least one first image IMG1. In the embodiment, the control module 11 is configured for driving the first LED display module 13 to display the first image IMG1, the second IMG2, and the third IMG3, which the number of the images displayed on the first LED display module 13 is not limited in the present disclosure.

In Step S110, the first driving 12 and the first LED display module 13 return the control signals corresponding to the first image IMG1 to the control module 11.

In Step S120, the control module 11 drives the second LED display module 14 according to the returned control signals for displaying the first image IMG1 corresponding to the returned control signals.

In Step S130, a user is applied to watch the first image IMG1 displayed on the second LED display module 14 to determine whether the first image IMG1 of the first LED display module 13 is distorted.

In the embodiment, a size of the first LED display module 13 and a size of the second LED display module 14 are the same or similar. In other words, the first image IMG1, the second IMG2, and the third image IMG3 on the first LED display module 13 can be re-displayed on the second LED display module 14. When the first image IMG1, the second IMG2, and the third image IMG3 on the first LED display module 13 have pixel errors caused by the image distortions or a loss of control signals, those pixel errors are also occurred on the first image IMG1, the second IMG2, and the third image IMG3 on the second LED display module 14. Therefore, the monitor can quickly fix and correct the issues. In the other embodiment, the size of the first LED display module 13 and the size of the second LED display module 14 can be different. The number of the LED units of the first LED display module 13 can be different from the number of the LED units of the second LED display module 14.

According to the above, it is not necessary to utilize any additional detecting devices that are mounted at the area of the first LED display module. In other words, the second LED display module at the control site is used to determine whether the image displayed on the remote first LED display module has any pixel errors. Therefore, a lot of detecting devices and cost can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light emitting diode display system, comprising:
    a first light emitting diode display module, including a plurality of light emitting diode units for displaying an image;
    a second light emitting diode display module;
    a control module; and a first driving module, electrically connected to the control module and the first light emitting diode display module;

wherein the control module provides a plurality of control signals corresponding to the image to the first driving module for driving the light emitting diode units of the first light emitting diode display module, the first light emitting diode display module transmits the control signals corresponding to the image displayed on the first light emitting diode display module to the control module, the control module transmits received control signals corresponding to the image displayed on the first light emitting diode display module that is transmitted from the first light emitting diode display module to the second light emitting diode display module for re-displaying the image, and displaying the image on the second light emitting diode unit display module;

wherein is determined whether correctly displayed on the first light emitting diode display module according to the image re-displayed on the second light emitting diode display module.

2. The light emitting diode display system of claim 1, further comprising:

a second driving module, wherein the control module transmits the control signals transmitted from the first light emitting diode display module and the first driving module to the second driving module for driving the second light emitting diode display module.

3. The light emitting diode display system of the claim 2, wherein the second driving module includes a first driving unit and a second driving unit, the first driving unit and the second driving unit of the second driving module drives the second light emitting diode display module according to the control signals corresponding to image returned from the first light emitting diode display module and the first driving module.

4. The light emitting diode display system of claim 1, wherein the first driving module includes a first driving unit and a second driving unit, the first driving unit and the second driving unit are used for driving the first light emitting diode display module according to the control signals corresponding to the image that are provided by the control module.

5. The light emitting diode display system of claim 1, wherein the first light emitting diode display module includes a plurality of light emitting diode units, the second light emitting diode display module includes a plurality of light emitting diode units, the size of the first light emitting diode display module is the same with that of the second light emitting diode display module, the number of the light emitting diode units of the first light emitting diode display module and the number of the light emitting diode units of the second light emitting diode display module are similar.

6. The light emitting diode display system of claim 1, wherein the first light emitting diode display module includes a plurality of light emitting diode units, the second light emitting diode display module includes a plurality of light emitting diode units, the size of the first light emitting diode display module is different from that of the second light emitting diode display module, the number of the light emitting diode units of the first light emitting diode display module and the number of the light emitting diode units of the second light emitting diode display module are different.

7. The light emitting diode display system of claim 1, wherein the first light emitting diode display module is mounted at a first area, the second light emitting diode display module is mounted at a second area, the first area and the second area are different.

8. An image detecting method, used for a light emitting diode display system, the image detecting method comprising:

driving a first light emitting diode display module to display at least one first image according to a plurality of control signals;

the first light emitting diode display module returning the control signals;

driving a second light emitting diode display system to display the at least one first image according to returned control signals from the first light emitting diode display module;

determining whether the first image of the first light emitting diode display module is distorted according to the first image re-displayed on the second light emitting diode display module corresponding to the returned control signals.

* * * * *